No. 884,388. PATENTED APR. 14, 1908.
W. W. HILLS.
COUPLING FOR WHIFFLETREES.
APPLICATION FILED OCT. 25, 1907.
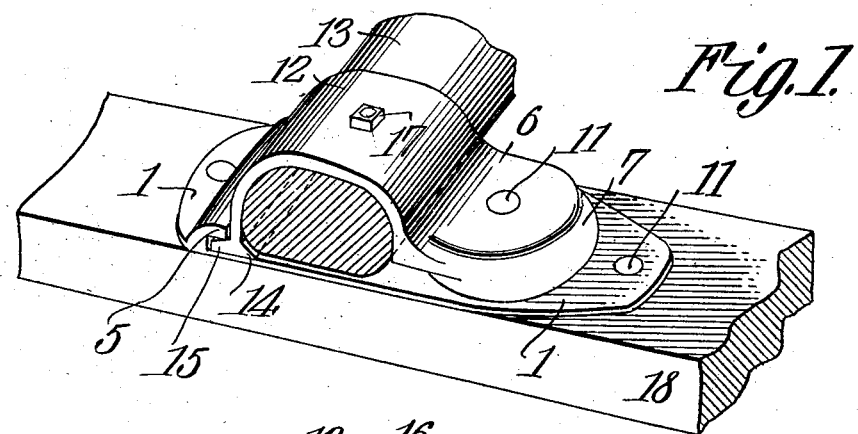
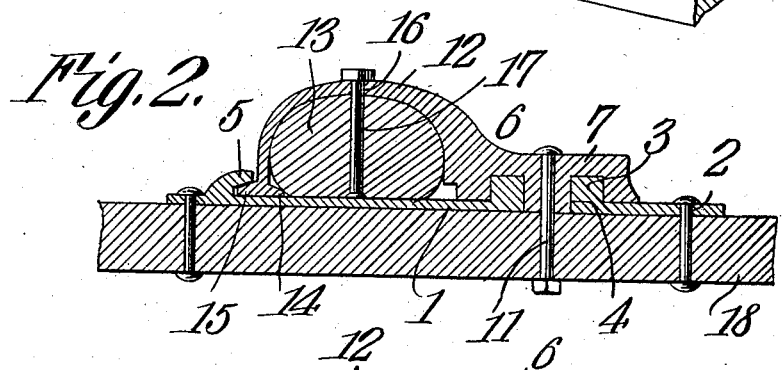
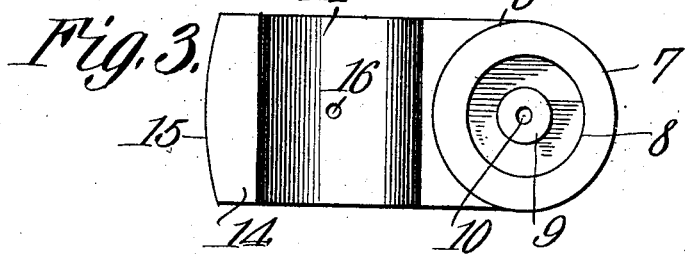
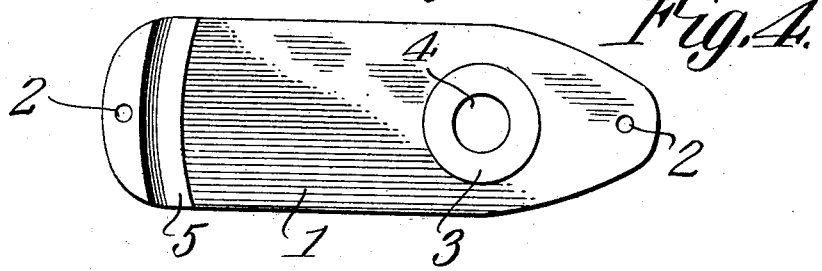
Witnesses
William W. Hills, Inventor
By C. A. Snow & Co.
Attorneys

UNITED STATES PATENT OFFICE.

WILLIAM W. HILLS, OF KALKASKA, MICHIGAN.

COUPLING FOR WHIFFLETREES.

No. 884,388.   Specification of Letters Patent.   Patented April 14, 1908.

Application filed October 25, 1907. Serial No. 399,166.

*To all whom it may concern:*

Be it known that I, WILLIAM W. HILLS, a citizen of the United States, residing at Kalkaska, in the county of Kalkaska and State of Michigan, have invented a new and useful Coupling for Whiffletrees, of which the following is a specification.

This invention relates to couplings for whiffletrees and its object is to provide a simple, durable, and efficient device of this character particularly designed for connecting an equalizer to the tongue of a vehicle in such a manner that the same will not be rolled or twisted as a result of the draft upon the swingletrees which are connected to and mounted upon the equalizer.

Considerable objection has heretofore been occasioned where the ordinary hammer strap is employed as a coupling for the equalizer because the whiffletrees which are connected to the ends of the equalizer tend to roll the same and as a result bend or otherwise injure the coupling of the whiffletree.

The object of the present invention is to overcome this objectionable feature and to provide means whereby the equalizer will be positively held in a predetermined relation to the tongue.

With these and other objects in view the invention consists of certain novel features of construction and combinations of parts which will be hereinafter more fully described and pointed out in the claims.

In the accompanying drawings is shown the preferred form of the invention.

In said drawings: Figure 1 is a perspective view showing the device in use. Fig. 2 is a longitudinal section through the coupling. Fig. 3 is an inverted plan view of the movable member of the coupling. Fig. 4 is a plan view of the base member.

Referring to the figures by characters of reference, 1 designates a base plate of any suitable outline and having apertures 2 adjacent its ends for the reception of bolts or other securing means whereby the same may be readily fastened upon a vehicle tongue. Upstanding from and formed integral with the plate 1 is a boss 3 having a circular orifice 4 and formed upon the plate adjacent one end is a retaining flange 5 curved from end to end and overhanging the plate.

Mounted upon the base plate is a top plate 6 having an enlarged end portion 7 provided with a circular socket 8 into which the boss 3 is designed to project. This socket has a central cylindrical stud 9 designed to project into the orifice 4 and provided with an opening 10 for the reception of a swivel bolt 11. Extending from the enlargement 7 is an arched portion 12 designed to straddle the middle portion of an equalizer 13 and the terminal of which has oppositely extending flanges 14 and 15 the inner one of which is designed to extend under the equalizer while the outer flange 15, which is curved in the direction of its length, is designed to project under the retaining flange 5 and to slide longitudinally therebelow. An opening 16 is formed in the top of the arched portion 12 for the reception of a bolt 17 whereby said arched portion may be securely fastened to the equalizer.

In use, the plate 1 is secured to a tongue 18 so that the flange 5 will be at the forward end of the plate. The arched portion 12 is then fastened to the equalizer after which the enlargement 7 is placed with boss 3 in socket 8 and with stud 9 in orifice 4. Flange 15 is swung beneath the retaining flange 5 and the swivel bolt 11 is inserted through the parts so as to securely fasten them together. As the arched portion fits snugly upon and is secured to the equalizer it will be apparent that should the draft exerted upon the equalizer through the swingletrees tend to roll the equalizer this tendency will be offset because of the particular connections between the plates 1 and 6. The flanges 15 and 5 while coöperating will obviously hold the two parts against separation. It will also be obvious that the wear at the point of connection between the evener and the tongue is borne solely by the two plates 1 and 6. Moreover, with this construction the evener is not weakened as is the case where a pivot bolt is extended through it. It will also be noted that the bolt 11 is not subjected to any transverse strain but merely serves to hold the parts together because such transverse strain is taken up solely by the boss 3 and stud 9 and by the retaining flange 5.

What is claimed is:

In a device of the character described the combination with a base plate having an upstanding boss provided with a central orifice, and a transversely extending arcuate retaining flange integral with the base and removed from the boss; of an arched top plate bearing at its ends upon the base plate, one of said ends having a socketed extension bearing upon and surrounding the boss, the other end of said top plate having an outstanding flange slidably engaging and overlapped by the retaining flange, and means for clamping a tree against the inner face of the top plate in position to bear upon the base plate.

In testimony that I claim the foregoing as my own, I have hereto affixed my signature in the presence of two witnesses.

WILLIAM W. HILLS.

Witnesses:
 C. M. SWAVERLY,
 CHAS. H. DE PUY.